United States Patent
Pipkin

[15] 3,705,381
[45] Dec. 5, 1972

[54] RESONANT TARGET SONAR SYSTEM

[72] Inventor: Edward L. Pipkin, Panama City, Fla.

[73] Assignee: The United States of America as represented by the Secretary of the Navy

[22] Filed: March 12, 1968

[21] Appl. No.: 713,277

[52] U.S. Cl. ............340/3 R, 181/0.5 AP, 340/3 FM
[51] Int. Cl. .................................................G01s 9/66
[58] Field of Search ....340/3, 3 R, 3 FM; 181/0.5 AP

[56] References Cited

UNITED STATES PATENTS 1,504,247  8/1924  Jacques......................340/3 R
3,212,053  10/1965  Finney.......................340/3 R

*Primary Examiner*—Richard A. Farley
*Attorney*—Louis A. Miller, Don D. Doty and William T. Skeer

[57] ABSTRACT

A sonar system having a first broadcaster for generating and broadcasting a predetermined frequency search signal toward a target to be located and classified and a second broadcaster for generating and broadcasting a second signal having a frequency substantially the same as the resonant frequency of the type of target being hunted for effecting the vibration thereof at its resonant frequency. A programmer connected to said first and second broadcasters in such manner as to effect the broadcast of said second signal, so as to vibrate said target a predetermined period of time before, during, and after the broadcast of alternate ones of said search signal. A receiver having a filter for filtering out said second signal after both said search and second signals have been reflected as unmodulated and vibration modulated signals from said target, a delay for delaying said filtered signal an amount such that the unmodulated and modulated portions thereof coincide in time, a subtractor for producing a signal representing the difference between said unmodulated and modulated signals, and a readout for displaying said difference signal in terms of the characteristics of the aforesaid target.

11 Claims, 3 Drawing Figures

Edward L. Pipkin
INVENTOR.

BY
Don D. Doty
Attorney

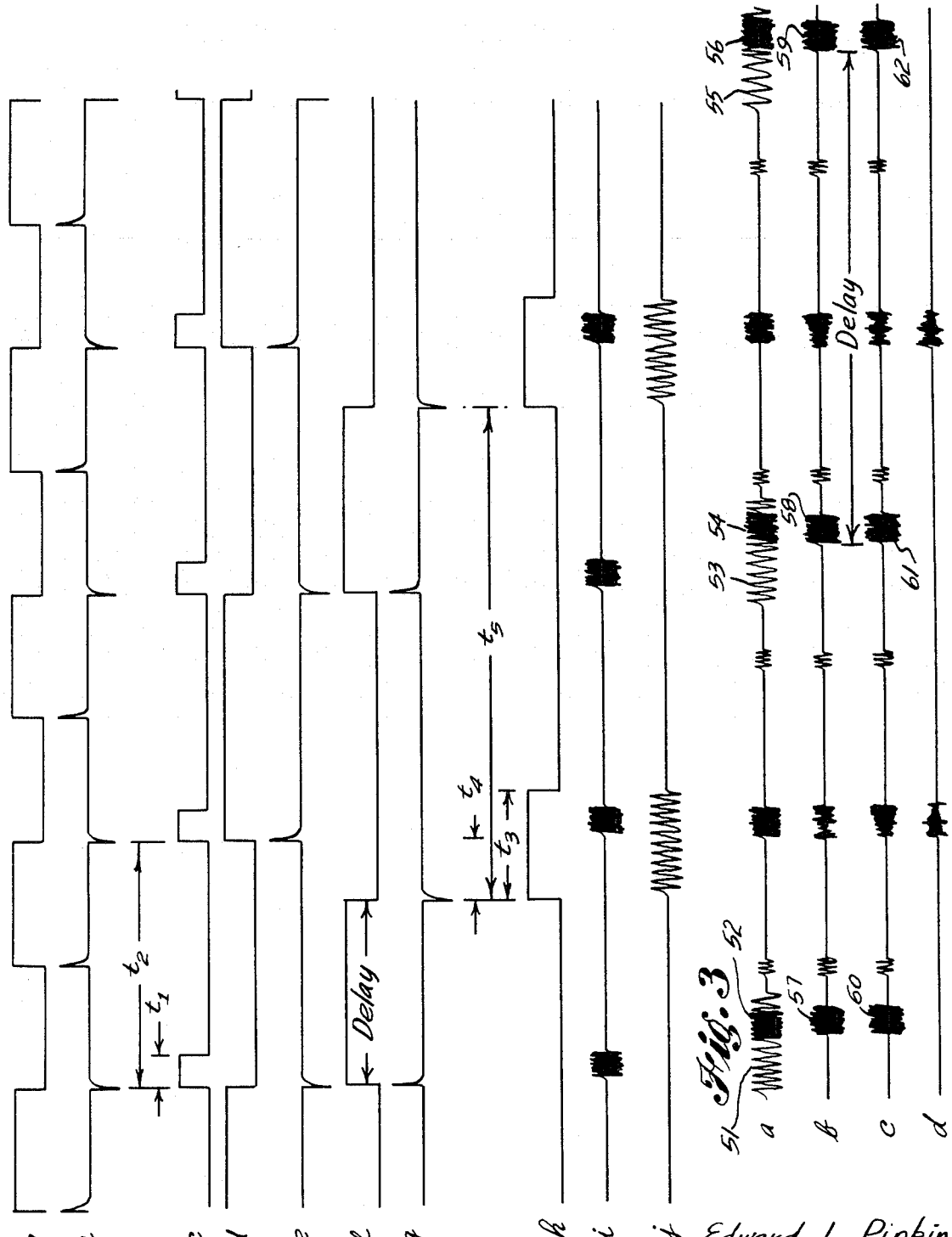

RESONANT TARGET SONAR SYSTEM

The present invention relates generally to echo-search-ranging systems and, in particular, is a sonar system which vibrates an acquired subaqueous target at its resonant frequency while being echo-searched at a predetermined search signal frequency as an improved method and means for the detection and classification thereof.

In the past, conventional sonars have been used to locate and classify submarine targets, such as marine mines, submarine boats, or other marine objects that are submerged within sea water or laying or perhaps buried in the sea floor, as the case may be, respectively. Although satisfactory in some instances, for the most part, they leave a great deal to be desired, especially from the target classification standpoint. For example, the sonars of the prior art cannot adequately discriminate between a particular target and its environmental background whenever it is located in clutter or on an irregular ocean bottom. Moreover, those sonar systems which have been categorized as high-resolution sonars are usually high-frequency devices and, thus, their search range is inordinately limited.

The subject invention overcomes most of the aforementioned disadvantages and, therefore, ostensively constitutes a considerable advancement in the sonar art.

It is, therefore, an object of this invention to provide an improved sonar system.

Another object of this invention is to provide an improved echo-search-ranging system that facilitates the acquiring and classification of particular targets within a predetermined environmental medium.

Still another object of this invention is to provide a sonar system which facilitates the locating and classifying of marine targets submerged within sea water, laying on the sea floor, and buried or partially buried within the sea floor with improved fidelity.

A further object of this invention is to provide an improved method and means for locating and classifying marine mines, submarine boats, and the like.

A further object of this invention is to provide a sonar system having improved signal-to-noise characteristics, thereby having an improved ability to distinguish between desired targets and ambient clutter and to discriminate against the latter.

Another object of this invention is to provide an improved method and means of enhancing a given static target's acoustical reflection characteristics by causing it to vibrate in its resonant mode.

Another object of this invention is to provide an improved method and means for inducing the doppler effect in a particular static target being searched and/or classified.

Another object of this invention is to provide a relatively simple sonar system that may be easily and economically manufactured, maintained and operated.

Other objects and many of the attendant advantages will be readily appreciated as the subject invention becomes better understood by reference to the following detailed description, when considered in conjunction with the accompanying drawings wherein:

FIG. 2 is an idealized graphical representation of the various signal waveforms which occur as the respective outputs of the elements of the transmitter portion of the system of FIG. 1;

FIG. 3 is an idealized graphical representation of the various signal waveforms which occur as the respective outputs of the elements of the receiver portion of the system of FIG. 1.

Figure 1:
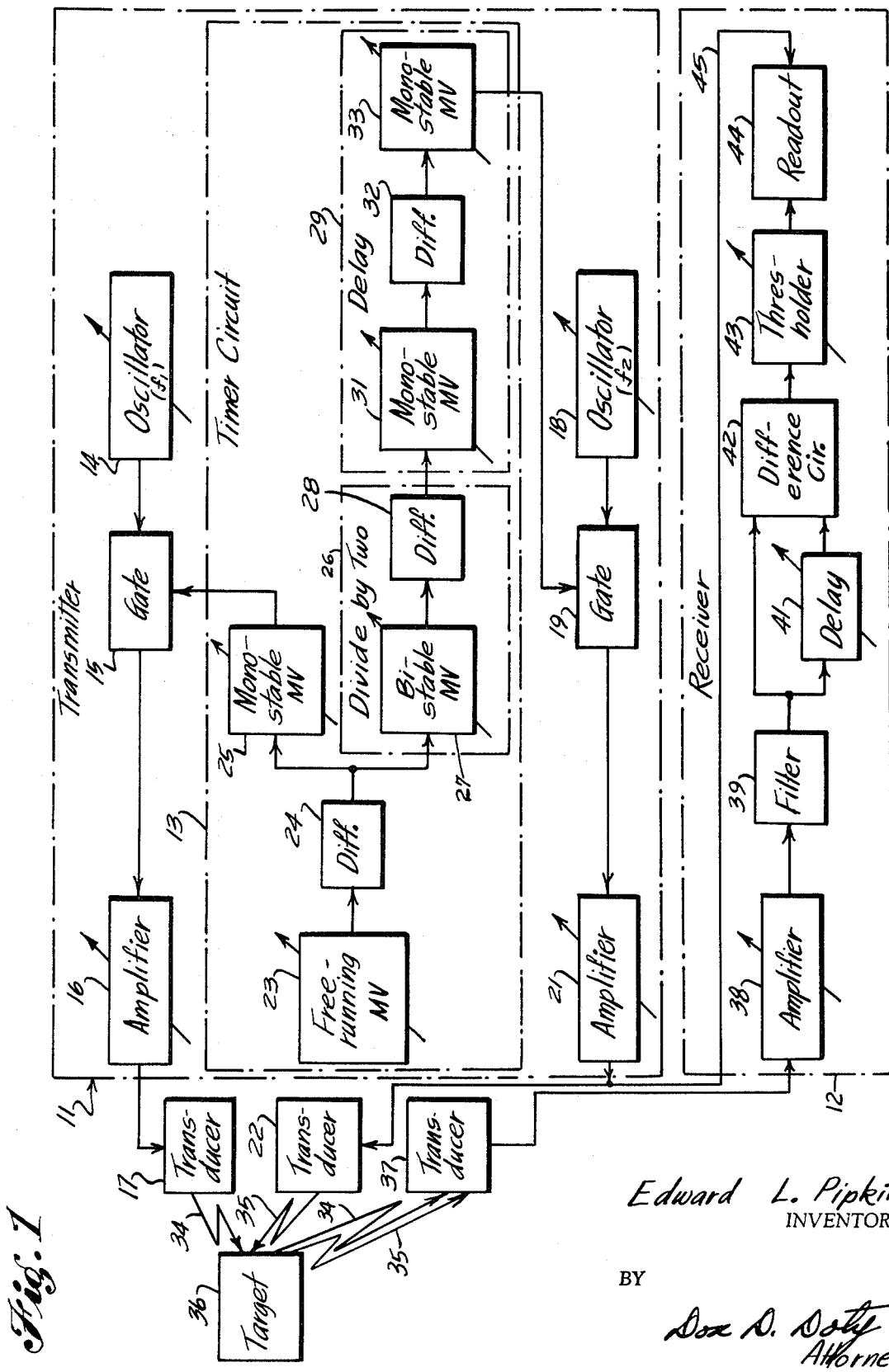
FIG. 1 is a block diagram of the subject invention.

Referring now to FIG. 1, the preferred embodiment of the subject invention is shown as having a transmitter 11, a receiver 12, and a timing circuit 13 for programming the operation of transmitter 11.

As may readily be seen, an oscillator 14 for generating a predetermined frequency ($f1$) is included in transmitter 11 and, of course, in this particular instance, should be so designed as to be adjustable within a given frequency range which is appropriate for any given operational circumstances. The output of oscillator 14 is connected to the input of a gate 15, the output of which is connected through a variable amplifier 16, before being connected to the input of a transmitting transducer 17. Because this particular preferred embodiment is herewith disclosed as being a sonar system for the intended use of locating and classifying underwater targets, transmitting transducer 17 is an appropriately designed electroacoustical transducer.

Another variable oscillator 18 is included in transmitter 11 for the purpose of generating another oscillatory signal having a frequency ($f2$), and the output thereof is connected to the input of a gate 19. The output of gate 19 is coupled through an amplifier 21, the output of which is connected to the input of another transmitting transducer 22 which is, likewise, an electroacoustical transducer designed for broadcasting acoustical energy throughout a subaqueous medium but, of course, is designed for the broadcasting of any frequency $f2$ produced within the operational range of the aforesaid oscillator 18.

Timing circuit 13, which determines the relative times and durations of broadcast of the aforementioned signals $f_1$ and $f_2$, includes a free-running multivibrator 23, the frequency of which may be varied as desired. The output of multivibrator 23 is coupled to the input of a differentiator 24, and the output thereof is connected to both the input of a monostable multivibrator 25 and the input of a divide by two frequency divider 26. The output of monostable multivibrator 25 is connected to the control input of the aforementioned gate 15 for the timely opening and closing thereof. The output of the aforesaid differentiator 24 is also, in fact, connected to the input of a variable bistable multivibrator 27, which actually constitutes the input element of said divide by two circuit 26. The output of bistable multivibrator 27 is connected to the input of a differentiator 28, the output of which is connected to a predetermined delay 29. As may readily be seen, the aforementioned series connected bistable multivibrator 27 and differentiator 28 constitute the divide by two circuit 26. The input element of delay 29 is a variable monostable multivibrator 31 and is, in actual practice, connected to the output of differentiator 28 of divide by two circuit 26. The output of monostable multivibrator 31 is connected to the input of another differentiator 32, the output of which is connected to the input of another variable monostable multivibrator 33. The output of monostable multivibrator 33 is connected to the control input of the aforementioned gate 19 for the timely opening and closing thereof.

Because this particular preferred embodiment is a sonar embodiment, transmitting transducers 17 and 22 respectively broadcast acoustical energies 34 and 35 throughout the subaqueous medium in which they are operating and toward a target 36, from which they are reflected as echoes toward a receiving transducer 37. Because transducer 37 is, likewise, intended to operate as a sonar receiving transducer, it is an electroacoustical transducer which converts sonic energy to electrical energy proportional thereto.

The output of transducer 37 is connected to the input of a variable amplifier 38 located within receiver 12, and the output of amplifier 38 is connected to the input of a filter 39 which, of necessity, is so designed as to filter out all of the $f_2$ signal frequencies generated by the aforementioned oscillator 18 and broadcast by the aforesaid transmitting transducer 22, for reasons which will be explained more fully subsequently in the discussion of the operation of the entire invention. The output of filter 39 is connected to the input of a variable delay 41 and to one of the inputs of a difference circuit 42, and the output of delay 41 is connected to the other input of said difference circuit 42. The output of difference circuit 42 is connected to a variable thresholder 43, with the output thereof connected to the intelligence input of a readout 44. The horizontal sweep circuit of readout 44 (which, for example, may be an oscilloscope) is, in this particular instance, triggered by a suitable synchronization signal by means of electrical conductor 45 which is connected thereto from the output of the aforementioned amplifier 21 of transmitter 11.

It should be understood that all of the components of the invention set forth in block form in the functional diagram of FIG. 1 are well known and conventional per se. Therefore, it is their unique interconnections and interactions which effect their combination in such manner as to produce the subject invention and which fulfill the objectives and produce the improved results indicated above.

It should also be understood that although the preferred embodiment of the subject invention is one which operates to echo-search-range upon underwater targets, by using suitable design parameters and appropriate well known design techniques along with the teaching herewith presented, it may be converted to the type of echo-search-ranging system that may be employed to locate and classify targets occurring in other environmental mediums, without violating the claimed spirit and scope thereof.

The operation of the invention will now be discussed briefly in conjunction with FIGS. 1, 2, and 3.

Generally speaking, a first train of signal bursts or pings having a given frequency ($f_1$) and width and a predetermined repetition rate is timely generated and transmitted by transmitter 11 through the sea water toward the sea floor as a first target search signal. In addition, a second train of signal bursts or pings having a lower frequency ($f_2$) and longer width than said first train of bursts or pings, with the frequencies thereof in the range of known resonant frequencies of the submarine objects to be detected and classified, is generated and also transmitted toward the sea floor at a repetition rate that is such that each burst thereof occurs slightly before and continues through every other burst of said first train of signal burst. As a result of such transmissions, any acquired target 36 is resonated every other burst by said second signal before and during the reflection of said first signal therefrom, thereby causing said first signal to be somewhat changed or modulated in frequency and to include some significant sideband characteristics.

During the reception period, both of the aforesaid transmitted signals containing alternate modulated and unmodulated target echoes are received by receiver 12. Removal of the $f_2$ signals from the modulated one is effected by filtering, and the resulting signal is then delayed sufficiently to coincide in time with the unmodulated signal immediately following it. As a result, when both of said signals are compared by a subtraction means, an output signal is produced, the amplitude configuration of which represents the presence of a particular target, in the event complete signal cancellation does not occur.

It appears to be noteworthy that the aforementioned transmission — and, in turn, reception — procedures are successfully effect, either directly or indirectly, by means of unique timer circuit or programmer 13, which properly times the broadcast of frequencies $f_1$ and $f_2$. Such programming is actually accomplished as a result of the following signal processing:

Free-running or astable multivibrator 23 generates a master clock control signal in the form of a rectangular wave, such as that ideally depicted in FIG. 2(a). Differentation thereof by differentiator 24 produces relatively sharp trigger pulses of the type illustrated in FIG. 2(b), which are used to timely change the state of monostable multivibrator 25. Of course, the duration of said changed state is determined by the manual or other setting of adjustable multivibrator 25 and, accordingly, an asymmetrical rectangular waveform similar to that depicted in FIG. 2(c) is produced thereby.

Because the aforementioned gate 15 of transmitter 11 is designed to be opened by a predetermined positive signal being applied to the control input thereof, it is opened whenever the positive portion of the waveform of FIG. 2(c) occurs. It remains open for the time duration $t_1$ and passes the $f_1$ signals emanating from the output of oscillator 14 to effect a signal waveform substantially similar to that of FIG. 2(i). Of course, the rate at which gate 15 is opened is determined by $t_2$, the time interval selected between the leading edges of the aforesaid positive portions of the waveform of FIG. 2(c).

In order to divide the frequency of the pulses from differentiator 24 by 2, the output signal therefrom is applied to the input of bistable multivibrator 27, which is preset to change state every other pulse, thereby producing the waveform of FIG. 2(d) at the output thereof. Differentiating said waveform by differentiator 28, in turn, produces the pulses of the waveform of FIG. 2(e). In this particular instance, only the positive ones thereof are used to trigger a state change in monostable multivibrator 28, the duration of which is controlled by the appropriate manual or other adjustment thereof. As a result, a signal waveform similar to that of FIG. 2(f) is generated. Being variable, the trailing edge of the signal produced by monostable multivibrator 31 may be made to occur at whatever delayed time it is desired, and when this signal is differentiated by differentiator 32, a negative pulse occurs coincidentally therewith, as is shown in the waveform of FIG. 2(g).

The negative pulses of said waveform are then used to timely trigger a state change in monostable multivibrator 33, the duration $t_3$ of which is preset therein by making the proper adjustment thereto. Thus, the waveform of FIG. 2(h) is produced, which controls the period gate 19 is open. Time $t_4$ has, of course, been selected as that amount of time which should transpire before the aforementioned gate 15 is opened, and, hence, determines the periods of time which the $f_2$ frequency signals are broadcast before the $f_1$ frequency signals are broadcast. Also, in this particular instance, it may be noteworthy that gate 19 is open during the period gate 15 is open plus some additional time to insure that both frequencies $f_1$ and $f_2$ are impacting on an acquired target at the same time for every other ping of $f_1$. Accordingly, a signal waveform substantially similar to that illustrated in FIG. 2(j) is broadcast by transducer 22 toward target 36 some given time before, during, and after the search signal waveform of FIG. 2(i) is broadcast toward it.

Once a significant target is acquired by receiver 12, receiving transducer 37 may, for example, be receiving an acoustical signal which is similar to that ideally depicted in FIG. 3(a). Such signal includes the overlapping or intermodulated $f_1$ and $f_2$ frequencies plus those signals which change as a result of the target being vibrated essentially at its resonant frequency by the transmitted $f_2$ signal. After filtering by filter 39, the $f_2$ frequencies are deleted therefrom, leaving a signal having the general appearance of the waveform of FIG. 3(b).

In order to keep the particular embodiment of the subject invention disclosed herewith as simple as possible, it has not been engineered to optimize the operation thereof. Hence, cross-talk signals, such as, for example, signals 51 through 62 are shown in the waveforms of FIG. 3(a), FIG. 3(b), and FIG. 3(c), respectively. However, it would be well within the purview of one skilled in the art having the benefit of the teachings herewith presented to include transmit-receive switches or the like in the subject system to eliminate such cross-talk, if so desired.

After being filtered to delete the $f_2$, signals, the waveform of FIG. 3(b) is delayed or stored for such period of time as to make the vibrated target echoes (that is, the modulated echo signals) coincide in time with the immediately following target search echoes (that is, the unmodulated echo signals). Such a delayed signal would, thus, have the ideal appearance of that illustrated in FIG. 3(c). Then, when the signal of FIG. 3(c) is subtracted from the signal of FIG. 3(b), the difference signal depicted in FIG. 3(d) is obtained. Any resulting pulses or blips occurring therein, of course, indicate that a difference exists between the echoes from the vibrated target and the unvibrated target, which, in turn, indicate that a particular target — that is, the type of target being hunted — has been acquired.

As previously suggested, said particular type of target is detected and classified by means of the known $f_2$ frequency signal employed as the target resonating signal. By prior calibration, the resonance frequency of various and sundry objects has been ascertained as accurately as possible. Furthermore, by analogous reasoning, unknown acquired targets are more readily classified, due to the fact that similar items may have similar resonant frequencies. Hence, in the cases where actual prior calibration of target objects is possible, the classification accuracy is vastly improved, and in the cases where actual calibration of target objects has not been possible, the probabilities of accurately classifying them is considerably improved. As a result of this, known enemy marine mines and our own marine mines are accurately detected and classified far more often than they were previously, and unknown targets can be detected and their classifications probably predicted by analogy, too. Accordingly, for many purposes, the instant invention is superior to the conventional prior art sonars used heretofore for such purposes.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

The invention described herein may be manufactured and used by or for the Government of the United States of America for governmental purposes without the payment of any royalties thereon or therefor.

What is claimed is:

1. A sonar system comprising in combination:
   means for timely broadcasting a first frequency signal in search of a subaqueous target;
   means for timely broadcasting a second frequency signal toward said subaqueous target, with the frequency thereof substantially similar to the resonant frequency of said target;
   means connected to said first and second frequency signal broadcasting means for effecting the broadcast of said first and second frequency signals at such times and for such durations, respectively, that the second thereof vibrates said target at the same time every other one of the first thereof reflects therefrom in accordance with a predetermined program;
   means for receiving said first and second frequency signals after they have been reflected from said target;
   means connected to the output of said receiving means for producing signals representing the difference between the first frequency echo signals reflected from said target while it is being resonated by said second frequency signal and the first frequency echo signals reflected from said targets while it is not being resonated by said second frequency signal; and
   means connected to the output of said representative difference signal producing means for reading out the representative difference signal therefrom.

2. The device of claim 1 wherein said means for broadcasting a first frequency signal in search of a subaqueous target comprises:
   a first oscillator for producing a predetermined frequency signal at the output thereof;
   a gate having a data input and a control input, with the data input thereof connected to the output of said variable oscillator, and the control input thereof adapted for opening and closing said gate in response to predetermined signals applied thereto; and a transducer effectively connected to the output of the aforesaid gate.

3. The device of claim 1 wherein said means for broadcasting a second frequency signal toward said subaqueous target, with the frequency thereof substantially similar to the resonant frequency of said target, comprises:

a variable oscillator for producing a predetermined frequency signal at the output thereof which is substantially the same as the resonant frequency of the target being hunted;

a gate having a data input and a control input, with the data input thereof connected to the output of said variable oscillator, and the control input thereof adapted for opening and closing said gate in response to predetermined signals applied thereto; and a transducer effectively connected to the output of the aforesaid gate.

4. The device of claim 1 wherein said means for receiving said first and second frequency signals after they have been reflected from said target comprises a transducer.

5. The device of claim 1 wherein said means connected to said first and second frequency signal broadcasting means for effecting the broadcast of said first and second frequency signals at such times and for such durations, respectively, that the second thereof vibrates said target at the same time every other one of the first thereof reflects therefrom in accordance with a predetermined program, comprises:

a variable free-running multivibrator;

a differentiator connected to the output of said variable free-running multivibrator;

a variable monostable multivibrator having an input and an output, with the input thereof connected to the output of said differentiator and the output thereof connected to the time control input of the aforesaid first frequency signal broadcasting means;

a divide-by-two circuit means connected to the output of said differentiator; and a delay means having an input and an output, with the input thereof connected to the output of said divide-by-two circuit means and the output thereof connected to the time control input of the aforesaid second frequency signal broadcasting means.

6. The device of claim 5 wherein said divide-by-two circuit means comprises:

a variable bistable multivibrator; and a differentiator connected to the output of said variable bistable multivibrator.

7. The device of claim 5 wherein said delay means comprises:

a first variable monostable multivibrator;

a differentiator connected to the output of said first variable monostable multivibrator; and a second variable monostable multivibrator connected to the output of said differentiator.

8. The device of claim 1 wherein said means connected to the output of said receiving means for producing signals representing the difference between the first frequency echo signals reflected from said target while it is being resonated by said second frequency signal and the first frequency echo signals reflected from said target while it is not being resonated by said second frequency signal comprises:

a filter for filtering out said second frequency signal;

a variable delay means connected to the output of said filter; and a difference circuit having a pair of inputs and an output, with one of the inputs thereof connected to the output of said filter and with the other input thereof connected to the output of the aforesaid variable delay means.

9. The invention according to claim 8 further characterized by a readout effectively connected to the output of said difference circuit.

10. The invention according to claim 9 further characterized by a variable thresholder connected between the output of said difference circuit and the input of said readout.

11. An echo-search-ranging system for detecting and classifying a target located within a predetermined environmental medium comprising in combination:

a first variable oscillator for producing a given frequency signal at the output thereof;

a first gate having a data input and a control input, with the data input thereof connected to the output of said first variable oscillator;

a variable amplifier connected to the output of said gate;

a first transmitting transducer connected to the output of said first variable amplifier;

a second variable oscillator for producing a given frequency signal at the output thereof, the frequency of which is substantially the same as the resonant frequency of the target to be detected and classified;

a second gate having a data input and a control input with the data input thereof connected to the output of said second variable oscillator;

a second variable amplifier connected to the output of said first gate;

a second transmitting transducer connected to the output of said second variable amplifier;

a variable astable multivibrator;

a first differentiator connected to the output of said variable astable multivibrator;

a first variable monostable multivibrator connected between the output of said first differentiator and the control input of said first gate;

a variable bistable multivibrator connected to the output of said first differentiator;

a second differentiator connected to the output of said variable bistable multivibrator;

a second monostable multivibrator connected to the output of said second differentiator;

a third differentiator connected to the output of said second monostable multivibrator;

a third variable monostable multivibrator having an input and an output, with the input thereof connected to the output of said third differentiator and the output thereof connected to the control input of said second gate;

a receiving transducer;

a third variable amplifier connected to the output of said receiving transducer;

a filter connected to the output with said third variable amplifier for filtering out the signal frequency generated by the aforementioned second variable oscillator;

a delay line connected to the output of said filter;

a difference circuit having a pair of inputs and an output, with one of the inputs thereof connected to the output of said filter, and with the other input thereof connected to the output of said variable delay line;

a variable thresholder connected to the output of said difference circuit;

a readout having a data input and a synchronization input, with the data input thereof connected to the output of the aforementioned variable thresholder; and means connected between the output of said second variable amplifier and the synchronization input of said readout for timely supplying synchronization signals thereto.

* * * * *